(12) United States Patent
Kimia

(10) Patent No.: US 6,924,908 B1
(45) Date of Patent: Aug. 2, 2005

(54) COLOR MANAGEMENT SYSTEMS AND METHODS WITH IMPROVED COLOR MATCHING TECHNIQUES

(75) Inventor: Benjamin B. Kimia, Providence, RI (US)

(73) Assignee: Brown University Research Foundation, Providence, RI (US)

(*) Notice: Subject to any disclaimer, the term of this patent is extended or adjusted under 35 U.S.C. 154(b) by 951 days.

(21) Appl. No.: 09/583,354

(22) Filed: May 31, 2000

(51) Int. Cl.[7] .............................. B41B 1/00; G03F 3/08; H04N 1/46
(52) U.S. Cl. .................... 358/1.9; 358/520; 358/535
(58) Field of Search .................. 358/1.9, 520, 535, 358/501; 382/205, 218

(56) References Cited

U.S. PATENT DOCUMENTS

| | | | | |
|---|---|---|---|---|
| 4,959,711 A | * | 9/1990 | Hung et al. ............... | 358/523 |
| 5,065,234 A | * | 11/1991 | Hung et al. ............... | 358/523 |
| 5,384,901 A | * | 1/1995 | Glassner et al. ........... | 345/591 |
| 5,416,890 A | * | 5/1995 | Beretta ..................... | 345/590 |
| 5,563,724 A | | 10/1996 | Boll et al. ................. | 358/502 |
| 5,903,275 A | * | 5/1999 | Guay ....................... | 345/590 |
| 6,038,374 A | | 3/2000 | Jacob et al. .............. | 395/109 |
| 6,297,889 B1 | * | 10/2001 | Loce et al. ................ | 358/1.9 |
| 6,807,304 B2 | * | 10/2004 | Loce et al. ................ | 382/209 |

* cited by examiner

Primary Examiner—Madeleine Nguyen
(74) Attorney, Agent, or Firm—David E. Huang, Esq.

(57) ABSTRACT

Improved color management techniques use sample identifiers that define sample color areas having core areas and buffer areas adjacent the core areas. The core area defined by each sample identifier includes a unique set of colors. However, the buffer area defined by each sample identifier is a same common color (e.g., white). Sample color areas can be displayed or outputted (e.g., printed) adjacent to each other to form a region of sample color areas (e.g., a color image, a uniform region of color, etc.). Within such an arrangement, the buffer areas limit any ink bleed between the core areas of the sample color areas thus minimizing, or altogether avoiding, spectral interaction between inks of different core areas. This enables greater color control and consistency, as well as providing a large color gamut

31 Claims, 12 Drawing Sheets

COLOR LOOKUP TABLE 62

| | INDEX 122-1 | SAMPLE IDENTIFIER 124-1 | ADDITIONAL INFORMATION (OPTIONAL) 126-1 |
|---|---|---|---|
| 120-1 | INDEX 122-1 | SAMPLE IDENTIFIER 124-1 | ADDITIONAL INFORMATION (OPTIONAL) 126-1 |
| 120-2 | INDEX 122-2 | SAMPLE IDENTIFIER 124-2 | ADDITIONAL INFORMATION (OPTIONAL) 126-2 |
| 120-3 | INDEX 122-3 | SAMPLE IDENTIFIER 124-3 | ADDITIONAL INFORMATION (OPTIONAL) 126-3 |
| ⋮ | ⋮ | ⋮ | ⋮ |
| 120-R | INDEX 122-R | SAMPLE IDENTIFIER 124-R | ADDITIONAL INFORMATION (OPTIONAL) 126-R |

FIG. 7

COLOR MANAGEMENT SYSTEMS AND METHODS WITH IMPROVED COLOR MATCHING TECHNIQUES

BACKGROUND OF THE INVENTION

In general, color output devices such as televisions, color monitors and color printers are capable of displaying a variety of colors by combining only a few colors. For example, televisions and color monitors typically combine the colors red, green and blue to produce a spectrum of colors. Similarly, color printers typically use cyan, magenta and yellow to produce a spectrum of colors. Color printers often further use the color black.

Computer systems which include color output devices (e.g., a monitor, a printer, etc.) typically provide colors based on digital color representations in a color system or color space. For example, a typical color monitor provides colors according to color representations in RGB color space. RGB stands for red, green and blue. In a similar manner, a typical color printer provides colors according to color representations in CMY color space. CMY stands for cyan, magenta and yellow.

A typical color representation is a series of computer readable bits which identify a combination of colors within a color space. Accordingly, a color representation in RGB color space indicates amounts of red, green and blue which combine to form a particular color. Similarly, a color representation in CMY color space indicates amounts of cyan, magenta and yellow which combine to form a particular color.

Some computer color management systems can convert color representations in one color space into corresponding color representations in another color space. For example, some color management systems can convert a particular color representation in RGB color space into a corresponding color representation of that same color in CMY color space.

An organization called CIE, the Commission Internationale de l'Eclairage, has developed other color systems. One such color system is called the CIEXYZ color system. The CIEXYZ color system refers to a device independent color space which is based on three theoretical colors X, Y and Z. The CIE selected these colors such that all colors which are perceivable by the eye of "a standard observer" lie within the CIEXYZ color space.

Another CIE color system is the CIELAB color system. This system refers to another device independent color space which is based on the same theoretical colors X, Y and Z but defines color space coordinates in terms of brightness (L), a relative green-red sensation (a), and a relative blue-yellow sensation (b). Hue (h) and chroma (c) are derivable from these coordinates. In particular, $h = \arctan(b/a)$, and $c = (a^2 + b^2)^{(1/2)}$.

A thorough description of the CIEXYZ and CIELAB color systems is provided by Publication CIE 15.2-1986, the entire teachings of which are hereby incorporated by reference in their entirety.

SUMMARY OF THE INVENTION

It can be difficult for computer systems to provide color in a well-controlled and consistent manner based on color representations. For example, conventional high speed color printers, which combine the colors cyan, magenta and yellow in order to provide a variety of colors, are susceptible to a number of drawbacks. In particular, such printers typically have difficulty placing dots of colored ink in designated print areas (e.g., pixels, dots, macro-dots, etc., hereinafter generally referred to as a registration location) on a printable medium (e.g., paper). Often, such printers exhibit registration error of one registration location (i.e., one dot or pixel). Furthermore, such printers often encounter subtle ink smearing which contaminates neighboring registration locations.

FIG. 1 shows a portion of a conventional printable medium 20 (significantly enlarged for purposes of this description) having dots of ink printed thereon by a conventional high speed printer. CY indicates ink dots of cyan and yellow. CM indicates ink dots of cyan and magenta.

The printable medium 20 has an array of registration locations 24. As shown in the top right of FIG. 1, when the conventional high speed printer applies an ink dot 22 to a particular registration location 24, the ink dot 22 tends to cover that registration location 24 but extends beyond the registration location 24 into other registration locations 24 as well. In particular, the ink dot 22 includes multiple excess regions 26 (or dot registration error regions) where the ink dot 22 extends beyond the intended registration location 24 to be covered. Additionally, as shown in FIG. 1, the ink dots 22 tend to have an oval shape rather than a round shape which is, at least in part, due to movement or smearing of the ink dot 22 as the printable medium 20 moves within the printer. Unfortunately, such dot registration errors and ink smearing leads to a lack of control and a lack of consistency over the color generated by the printer, as well as to a small color gamut. In particular, such registration errors and ink smearing causes unintended spectral interaction between the ink dots thus generating incorrect and unstable color combinations.

In contrast to the above-described conventional approaches to providing color, the present invention is directed to color management techniques which use sample identifiers that define sample color areas having core areas and buffer areas adjacent the core areas. The core area defined by each sample identifier includes a unique set of colors. However, the buffer area defined by each sample identifier is a same common color (e.g., white). Sample color areas can be displayed or outputted (e.g., printed) adjacent to each other to form a region of sample color areas (e.g., a color image, a uniform region of color, etc.). Within such an arrangement, the buffer areas limit any ink bleed between the core areas of the sample color areas thus minimizing, or altogether avoiding, unintentional spectral interaction between inks of different core areas. This enables greater color control and consistency, as well as provides a large color gamut.

One arrangement of the invention is directed to a method for matching a target color with a sample color. The method includes the steps of (A) generating a target identifier that identifies the target color in a device independent color space, and (B) providing a set of color space distances based on (i) the target identifier and (ii) a set of sample identifiers that identifies a set of sample colors in the device independent color space. Each sample identifier defines a sample color area having a core area and a buffer area adjacent the core area The core area of the sample color area defined by each sample identifier includes a unique set of colors. Additionally, the buffer area of the sample color area defined by each sample identifier is a same common color (e.g., white). The method further includes the step of (C) selecting, from the set of sample identifiers, a particular sample identifier that identifies a particular sample color based on the set of color space distances, in order to match the target color with the particular sample color. The matching of the sample color to the target color is well-controlled and consistent since the sample identifier, which identifies the sample color, uses a core area and a buffer area which limits or avoids spectral interaction between inks of that core area and other core areas.

In one arrangement, step C involves obtaining, as the particular sample identifier, a data structure that defines (i) a J×K matrix of colored dots to form a core area, and (ii) multiple colored dots adjacent the J×K matrix to form a buffer area. In this arrangement the core and buffer areas combine to form sample color area having an M×N matrix of dots. J, K, M and N are integers in which J is less than M, and in which K is less than N. In one arrangement, the sample color area is a 3×3 matrix of dots, and the core area is a 2×2 matrix within the 3×3 matrix. Here, the buffer area is (i) a single column of dots and a single row of dots connecting to the column, and (ii) adjacent to the 2×2 core area.

In one arrangement, each color space distance is a sphere radius between the target color and one of the set of sample colors in the device independent color space (e.g., CIEXYZ color space). In this arrangement, step C involves choosing, as the particular sample identifier, a sample identifier that identifies a sample color that -provides a shortest sphere radius between the target color and any of the set of sample colors in the device independent color space. When operating within a device independent color space such as CIELAB or CIEXYZ, this arrangement enables equal prioritization or weighting of the various color space components, i.e., (L), (a) and (b) for the CIELAB color space, and (X), (Y) and (Z) for the CIEXYZ color space.

In one arrangement, step C involves determining that multiple sample colors provide substantially the same shortest sphere radius in the device independent color space (e.g., CIEXYZ); and choosing, from multiple sample identifiers that identify the multiple sample colors, a sample identifier that identifies a sample color that provides a closest hue plane to the target color in another device independent color space (e.g., CIELAB color space). This arrangement enables prioritization of one color attribute (hue) over other color attributes. Accordingly, when operating within an initial device independent color space such as CIEXYZ, and then operating within another device independent color space such as CIELAB, this arrangement prioritizes hue (i.e., the arctan of (b/a)), over other color attributes (i.e., the (L), (a) and (b) attributes). In some situations, this prioritization of hue over the other color attributes provides superior color matching as perceived by an observer since the typical observer more easily perceives differences in hue than differences in the other color attributes.

In one arrangement, the method repeats steps A, B and C for other target colors in order to match multiple target colors to multiple sample colors identified by the set of sample identifiers. In this arrangement, the method further includes the step of creating a color lookup table having multiple entries that match the multiple target colors to the multiple sample colors. Such a color lookup table can reside in a color output system for use in providing images having a sample color that matches a target color.

Another arrangement of the invention is directed to a method for providing an image having a sample color that matches a target color. The method includes the steps of generating a target identifier that identifies a target color, and selecting, from a set of sample identifiers and based on the target identifier, a sample identifier that identifies a sample color in order to match the target color with the sample color. Each sample identifier defines a sample color area having a core area and a buffer area adjacent the core area. The core area of the sample color area defined by each sample identifier includes a unique set of colors. Additionally, the buffer area of the sample color area defined by each sample identifier is a same common color. The method further includes the step of outputting an image having the sample color area defined by the selected sample identifier. The buffer areas can limit or prevent spectral interaction between inks of the core areas of adjacent sample color areas in order to improve color control and consistency, and provide a large color gamut.

In one arrangement, a color lookup table includes multiple entries. Each entry of the color lookup table includes a sample identifier (or index to a sample identifier) of the set of sample identifiers. In this arrangement, the step of selecting includes the step of choosing an entry of the color lookup table based on the generated target identifier, the sample identifier of the chosen entry being the selected sample identifier that identifies the sample color that is matched to the target color. Use of this color lookup table enables quick reference of suitable sample colors in response to target colors in order to minimize color selection (i.e., lookup) times.

In one arrangement, the method further includes the steps of (i) determining, for a region of another target color, that the other target color does not match any of the set of sample colors within a predetermined color distance in the device independent color space; and (ii) selecting, from the set of sample identifiers and in a pseudo-random manner, multiple sample identifiers that identify different sample colors in order to match the region of the other target color with the different sample colors identified by the multiple sample identifiers in an alternating manner. This arrangement enables randomization of selected colors in order to avoid undesirable color patterning effects (e.g., the appearance of repeating color patches) that would otherwise result from non-random selections.

One arrangement of the invention is directed to a method for ranking a set of sample colors relative to a target color. The method includes the steps of generating a target identifier that identifies a target color in a device independent color space; and providing a set of color space distances based on the target identifier and a set of sample identifiers that identifies a set of sample colors in the device independent color space. Each sample identifier defines a sample color area having a core area and a buffer area adjacent the core area. The core area of the sample color area defined by each sample identifier includes a unique set of colors. Additionally, the buffer area of the sample color area defined by each sample identifier is a same common color (e.g., white). The method further includes the step of ordering, based on the set of color space distances, sample identifiers of the set of sample identifiers in order to rank the sample colors identified by the sample identifiers relative to the target color.

Some arrangements of the invention are directed to systems which perform the above-described methods. Other arrangements of the invention are directed to computer program products (CD-ROMs, diskettes, tapes, etc.) having instructions stored thereon (i.e., as an application, a device driver, etc.) such that the instructions, when carried out by processors, cause the processors to perform the above-described methods.

The features of the invention, as described above, may be employed in computer systems, and other computer-related apparatus, methods and systems (e.g., printers and color management systems) such as those developed by the Brown University Research Foundation of Providence, R.I.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 7 is a block diagram of a color lookup table which is suitable for use by the color management system of FIG. 3.

DETAILED DESCRIPTION

The invention is directed to color management techniques which use sample identifiers that define sample color areas having core areas and buffer areas adjacent the core areas. The core area defined by each sample identifier includes a unique set of colors. However, the buffer area defined by each sample identifier is a same common color (e.g., white). Sample color areas can be displayed or outputted (e.g., printed) adjacent to each other to form a region of sample color areas (e.g., a color image, a uniform region of color, etc.). Within such an arrangement, the buffer areas limit any ink bleed between the core areas of the sample color areas thus minimizing, or altogether avoiding, spectral interaction between inks of different core areas. Avoidance of such interaction enables greater color control and consistency, as well as provides a large color gamut. The techniques of the invention may be employed in computer systems, and other computer-related apparatus, methods, and systems (e.g., printers, color management systems, etc.) such as those developed by the Brown University Research Foundation of Providence, R.I.

The color management techniques of the invention include (i) creating, based on color space distances, a color lookup table which stores matches between target colors identified by target identifiers and sample colors identified by sample identifiers, (ii) outputting a sample color which matches a target color by accessing the color lookup table, and (iii) ranking sample colors relative to a target color based on color space distances. A thorough description of these techniques will be provided after the following general description of a computer system which is capable of utilizing these techniques.

Figure 1:
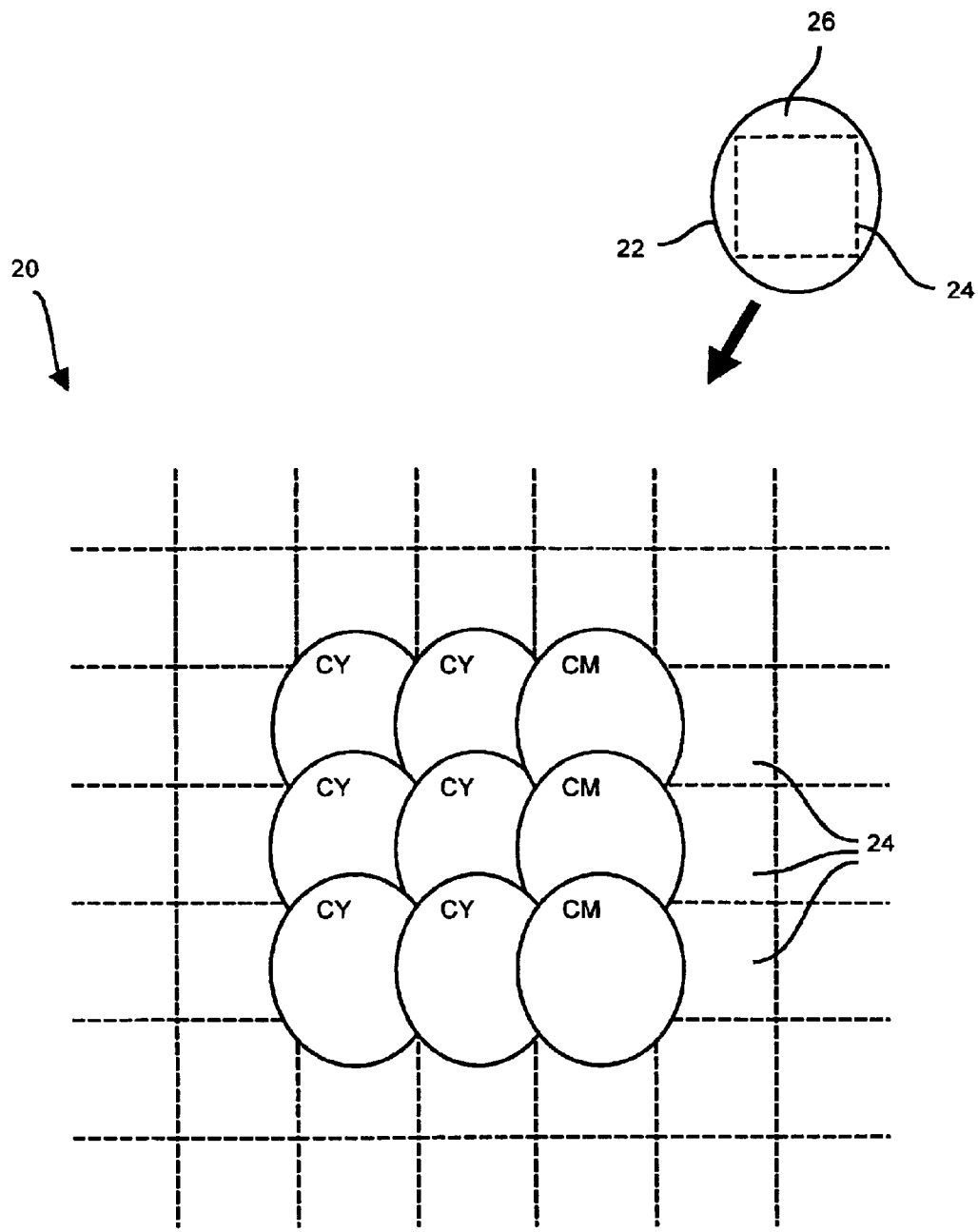
FIG. 1 is a block diagram showing the registration of ink dots on locations of a printable medium using a conventional printing technique.
Figure 2:
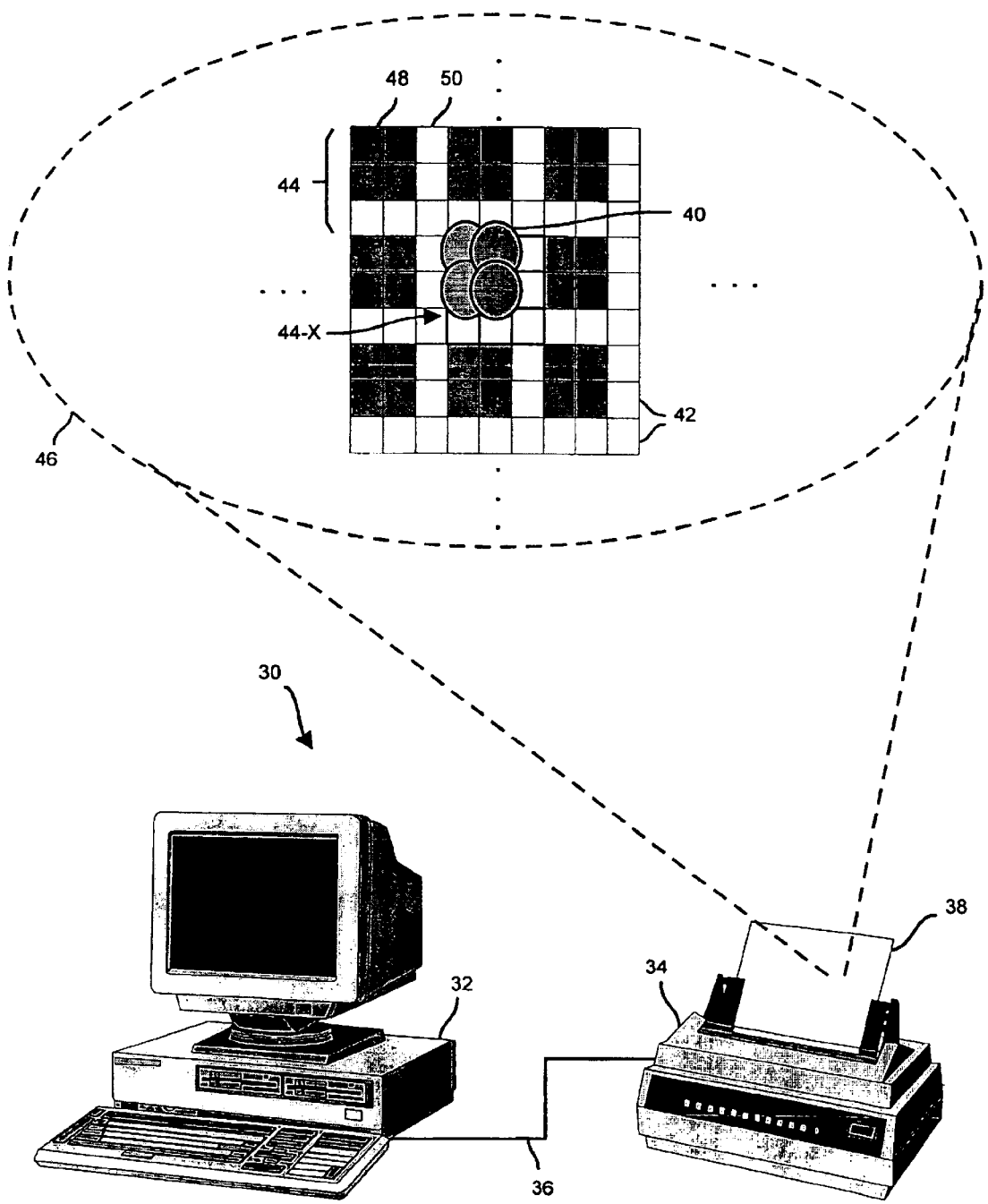
FIG. 2 is a diagram of a computer system which is capable of outputting color areas (e.g., 3×3 matrices) having core areas (e.g., 2×2 matrices) and adjacent buffer areas in accordance with the invention.

FIG. 2 shows a computer system 30 which is suitable for use by the invention. The computer system 30 includes a general purpose computer 32, a color output device 34, and a connecting medium 36 which connects the general purpose computer 32 with the color output device 34. By way of example only, the color output device 34 is a color printer (hereinafter referred to as the printer 34) which is capable of printing color on a printable medium 38. Preferably, the printer 34 prints only a few ink colors (e.g., cyan, magenta and yellow) but can combine these colors, through spectral and spatial interaction, to generate a wide range of sample colors. That is, the printer 34 is capable of printing dots of colored ink 40 onto registration locations 42 (e.g., pixel locations, dot regions, macro-dot regions, etc.) of the printable medium 38. When the printer 34 prints different colored ink dots 40 over the same registration location 42, the colors spectrally interact (i.e., fuse) to provide a distinct color. In one arrangement, the printer 34 can selectively print ink dots 40 of three colors: cyan, magenta and yellow, thus providing up to eight distinct colors for each registration location 42. Additionally, when the printer 34 prints different colors in adjacent registration locations 42, the different colors spatially interact (a phenomenon of human perception) to form a different color sensation.

The computer system 30 is capable of outputting sample color areas 44 (i.e., configurations of ink dots 40) over the printable medium 38. The printer 34 can place the sample color areas 44 adjacent to each other to form a region 46 of color on the printable medium 38 (e.g., a color image, a uniform region of color, etc.).

Each sample color area 44 includes a core area 48 and an adjacent buffer area 50. In one arrangement, each sample color area 44 is an M×N matrix of dots, each core area 48 is a J×K matrix of dots, and each buffer area 50 is one or more columns of dots and one or more rows of dots connecting to the columns. For example and a shown in FIG. 2, each sample color area 44 can be a 3×3 matrix, each core area 48 can be a 2×2 matrix, and each buffer area 50 can be a single column and a single row connecting to that column.

The core areas 48 within the arrangement 46 can have the same color to form a region of homogenous color, or different colors to form an image. However, the buffer areas 50 within the arrangement 46 must have a same common color. For example, the core area 48 of a first sample color area 44 can be a first color (e.g., red), and the core area 48 of a second sample color area 44 adjacent to the first sample color area 44 can be a different color (e.g., green). However, the buffer areas 50 of all of the sample color areas 44, including the first and second sample color areas 44, are the same color (e.g., white).

It should be understood that each ink dot 40 printed by the printer 34 may extend beyond its targeted registration location 42 and into an adjacent registration location 42, as shown in FIG. 2 for the ink dots 40 of a sample color area 44-X. This phenomenon may be, at least in part, due to movement of the printable medium 38 as the printer 34 applies the ink dots 40, excess ink for the ink dots 40, poor ink absorption factors of the printable medium 38, degradation of the ink absorption factors of the printable medium 38 (e.g., due to heat from the printer 34, prior applied ink dots to the same registration location 42, etc.), ink impurities, and other factors. Nevertheless, the buffer areas 50 limit, or altogether prevent, any unintended spectral interaction between the ink dots 40 of the core areas 48 since the ink dots 40 of the core areas 48 extend into the buffer areas 50 rather than directly into other core areas 48. In particular, when the ink dots 40 are prevented from extending beyond half of each adjacent registration location 42, there is no spectral interaction between core areas 48. Accordingly, the buffer areas 50 limit the effect of dot size variation of the color printer 34. The limited interaction between core areas 48 provides improved color control and consistency in color output. Furthermore, such control leads to sharper colors and a larger color gamut relative to results from conventional color printing approaches.

It should be further understood that each sample color area 44 is capable of providing a distinct user perceivable sample color. Recall that the core area 48 of each sample color area 44 includes ink dots 40 for multiple registration locations 42 (e.g., an M×N matrix). Within each registration location 42 of a core area 48, ink dots 40 spectrally interact to provide a distinct color, e.g., up to eight distinct colors for the three colors: cyan, magenta and yellow. The colors of the core area registration locations 42 spatially interact with each other to provide a particular core area color, e.g., one of roughly 1000 distinct colors for a 2×2 core area matrix (not counting substantially duplicate colors due to core area symmetry). Furthermore, the colored core area 48 interacts with the adjacent buffer area 50 (as well as with buffer areas 50 of adjacent sample color areas 44) to provide the distinct user perceivable sample color, e.g., one of roughly 1000 different sample colors for a 3×3 sample color area matrix having the 2×2 core area matrix). Further details of the computer system 30 will now be provided with reference to FIG. 3.

Figure 3:
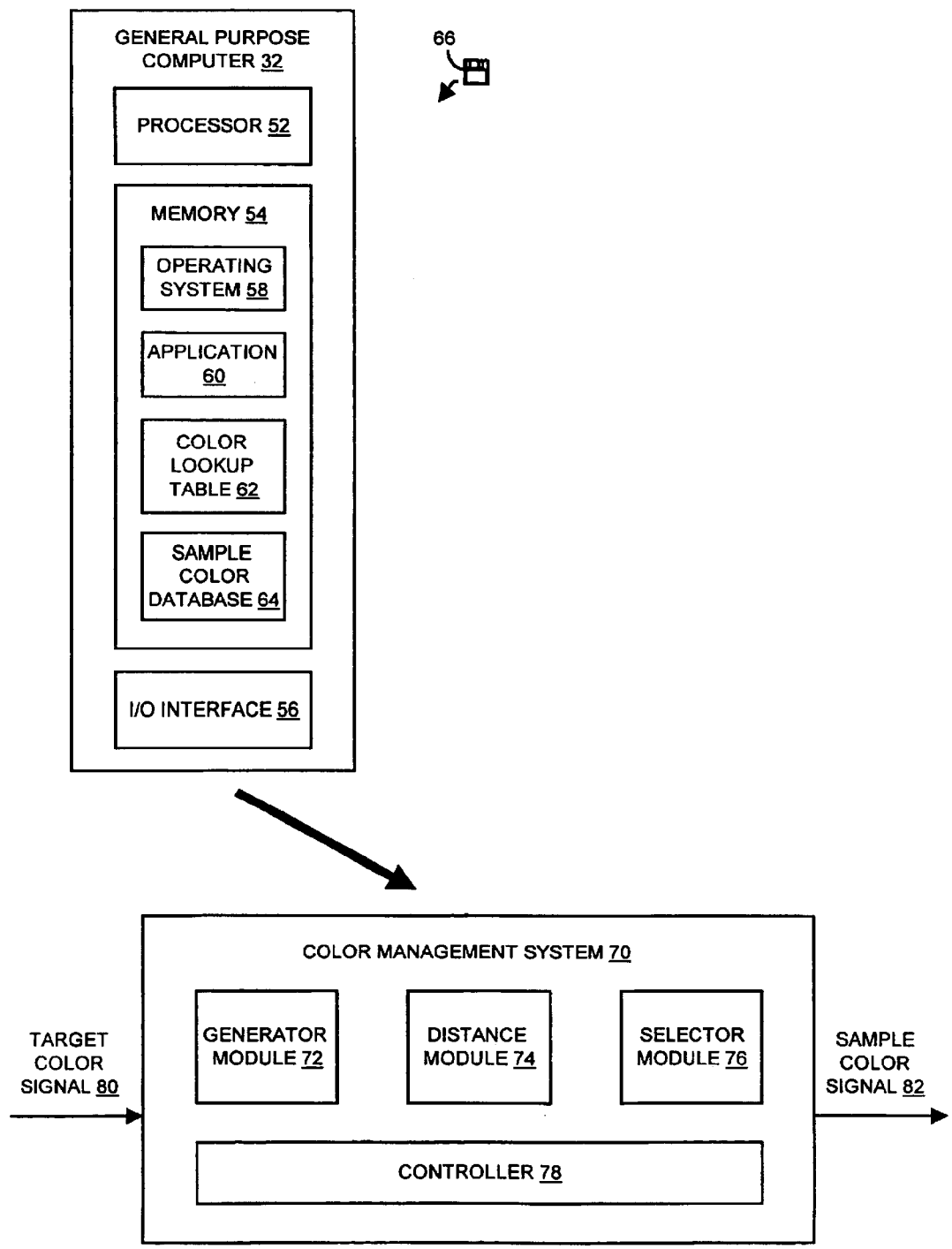
FIG. 3 is a block diagram of a general purpose computer which is capable of operating as a color management system of the computer system of FIG. 2.

FIG. 3 shows a block diagram of particular components of the general purpose computer 32 of FIG. 2. The computer 32 includes a processor 52, memory 54 and an I/O interface 56. The memory 54 includes, among other things, a variety of memory constructs such as an operating system 58, a color management application 60, a color lookup table 62, and a sample color database 64.

The sample color database 64 stores sample identifiers which identify sample colors that can be outputted by the color printer 34 (FIG. 2). The color management application 60 (i.e., the processor 52 executing the application 60) is capable of creating the color lookup table 62 which stores matches between target colors and these sample colors identified by the sample identifiers stored in the sample color database 64. In particular, the application 60 can direct the processor 52 to form the color lookup table 62 from a comparison of the target colors with the sample colors. After the color lookup table 62 is created, the application 60 can match subsequently received target colors to sample colors by simply accessing the color lookup table 62. Further details of how the application 60 matches target colors to sample colors, and how the application 60 creates the color lookup table 62 will be provided later below.

In one arrangement, a computer program product 66 (e.g., one or more CDROMs, tapes, diskettes, etc.) provides one or more of the above-described memory constructs to the computer 32. For example, the computer program product 66 may include the application 60 and the sample color database 64. In this example, the application 60 can be installed on the computer 32, and then invoked to create other memory constructs such as the color lookup table 62. As an alternative example, the computer 32 can acquire one or more of the memory constructs (e.g., the application 60 and the color lookup table 62) through other means, e.g., via a network download through the network interface 56.

Furthermore, in one arrangement, the color management application 60 is high-level user-based software running on the computer 32. In this arrangement, a user can enter commands and receive output directly through a graphical user interface (GUI) of the application 60. In another arrangement, the color management application 60 is lower-level software (e.g., one or more device drivers for the color output device 34), and a user operates one or more other applications (e.g., a desktop publishing application) which invokes the lower-level software.

When the processor 52 of the computer 32 runs in accordance with the operating system 58 and the color management application 60, the above-described components of the computer 32 form a color management system 70, as shown in FIG. 3. The color management system 70 includes a generator module 72, a distance module 74, a selector module 76 and a controller 78. The color management system 70 is capable of receiving a target color signal 80 identifying a target color and, in response, providing a sample color signal 82 identifying a sample color matched to the target color. The target color signal 80 may originate from a file stored in the memory 54 (e.g., a color bitmap file, a specialized file identifying a homogenous region of color, etc.) or may arrive through the I/O interface 56 (e.g., a network download from a remote server). In one arrangement, the color management system 70 uses the sample color signal 82 to create the color lookup table 62. In another arrangement, the color management system 70 accesses the color lookup table 62 to match subsequently received target colors to sample colors. In yet another arrangement, the color management system 70 ranks a set of sample colors to a target color. Further details of how the sample identifiers stored within the sample color database 64 identify sample colors will now be provided with reference to FIGS. 4 through 6.

Figure 4:
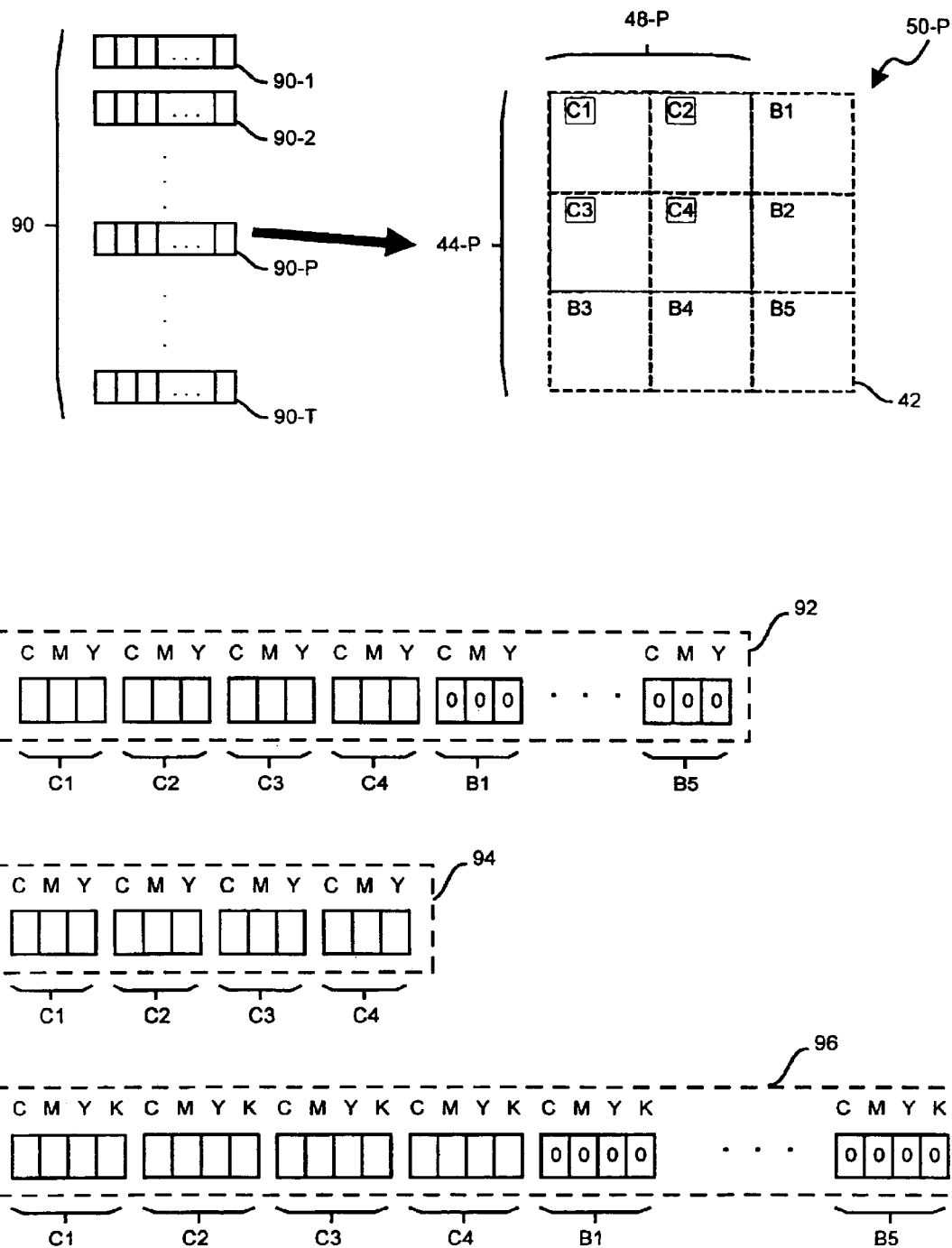
FIG. 4 is a block diagram of alternative formats for a sample identifier used by the color management system of FIG. 3 for defining each of the color areas of FIG. 2.

FIG. 4 shows a set of sample identifiers 90 which is suitable for use by the color management system 70, and which is stored within the sample color database 64. Each sample identifier 90 identifies a unique sample color. That is, each sample identifier 90 identifies a unique combination of colors (ink dots 40) for registration locations 42 of a sample color area 44. For example, as shown in FIG. 4, the sample identifier 90-P identifies a unique combination of colored ink dots 40 for a sample color area 44-P. Recall that each sample color area 44 includes a core area 48 having a variable core color and a buffer area 50 having a same common color. Accordingly, the core area 48-P has a unique core area color relative to the colors of core areas 48 of other sample color areas 44 identified by the other sample identifiers 90, and the buffer area 50-P has a color (e.g., white) which is the same color as that of buffer areas 50 for the other sample color areas 44. The unique core area color and common buffer area color interact to provide a unique sample color.

FIG. 4 further shows a suitable format 92 for each sample identifier 90. The format 92 includes bit portions (short series of bits) which correspond to registration locations 42 of the sample color area 44 identified by a sample identifier 90. By way of example only and as shown in FIG. 4, each bit portion includes three bits corresponding to the colors cyan, magenta and yellow. In particular, the bits of a first bit portion C1 indicate whether a registration location 42 labeled C1 includes cyan, magenta and yellow. Similarly, the bits of a second bit portion C2 indicate whether a registration location 42 labeled C2 includes cyan, magenta and yellow, and so on. In this example, if "101" resides in the first bit portion C1 of a sample identifier 90, the registration location 42 labeled C1 includes a cyan ink dot and a yellow ink dot, but no magenta ink dot.

As shown by way of example only in FIG. 4, each of the bit portions corresponding to the buffer area 50 of the sample color areas 44 (registration locations B1 through B5) includes "000" indicating that the buffer area registration locations 42 do not include any ink dots. Accordingly, the buffer area 50 of each sample color area 44 is the color of the printable medium 38, e.g., white. Nevertheless, it should be understood that colors other than the color of the printable medium 38 are suitable for buffer areas 50 as well. For example, use of a white printable medium 38 but setting one or more bits for each of the bit portions B1 through B5 (e.g., to "100") can provide a non-white common color to the buffer areas 48 (e.g., cyan).

It should be understood that formats other than the format 92 can be used for the sample identifier 90. For example and as shown in FIG. 4, a format 94 that does not include bit portions for the buffer areas 50 can be used when the buffer areas 50 of each sample area 44 use the color of the printable medium 38 (e.g., red). The color management system 70 provides no ink dots for any of the registration locations 42 in the buffer area 50 (e.g., registration locations 42 labeled B1 through B5). Since the format 94 does not include bit portions for the buffer areas 50, the format 94 requires less memory space (i.e., fewer bits) than the format 92.

It should also be understood that other alternative formats are suitable for the sample identifiers 90 as well. For example, FIG. 4 further shows an alternative format 96 for the sample identifiers 90 which contains additional information for each registration location 42. In particular, each bit portion of the alternative format 96 includes an extra bit indicating whether the registration location 42 for that bit portion includes black (K). Accordingly, in the example above, a pattern of "0001" in the bit portion C1 of a sample identifier 90 indicates that the registration location 42 labeled C1 includes a black dot, and not cyan, magenta or yellow dots. Further details of the sample identifiers 90 will now be provided with reference to FIGS. 5 and 6.

Figure 5:
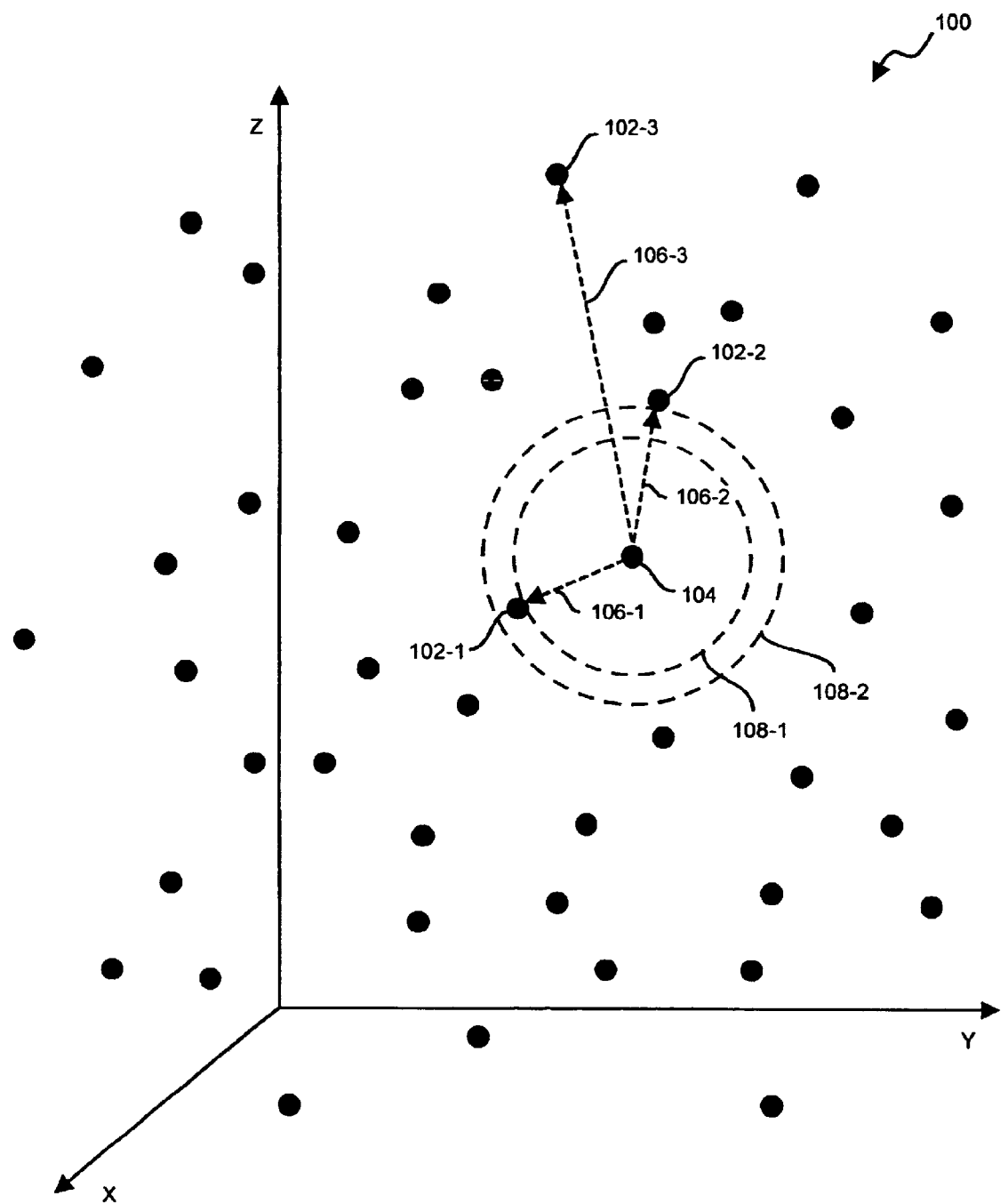
FIG. 5 is a diagram illustrating a technique used by the color management system of FIG. 3 for determining color space distances between a target color and sample colors within a device independent XYZ color space.

The sample colors identified by the sample identifiers 90 can be plotted in a device independent color space such as the CIEXYZ color space defined by the Commission Internationale de l'Eclairage (CIE). FIG. 5 shows a 3-dimensional graph of the CIEXYX color space. In some arrangements, there are over 1000 sample colors and thus over 1000 unique sample colors that can be plotted in the CIEXYZ color space. In general, each registration location 42 of a sample color area 44 has a point in CIEXYZ color space, and the integral of these registration locations 42 with respect to their respective areas (taking into account any overlap) yields a particular sample color point 102 in the CIEXYZ which represents a sample color for that sample color area 44. The following equation depicts the process of averaging over all of the registration locations 42.

$$\int (x, y, z) dA = \frac{\sum_{i=1}^{N} (x_i, y_i, z_i) A_i}{\sum_{i=1}^{N} A_i}.$$

The sample color point 102 is the predicted color that would be produced given the spatial arrangement of ink dots for the sample color area 44. For illustration purposes, FIG. 5 includes several sample color points 102 (i.e., CIEXYZ vectors) which represent the plottings of corresponding sample colors identified by the sample identifiers 90 stored in the sample color database 64.

The application 60 is capable of finding the sample color point 102 which is closest to a target color point 104 (i.e., another CIEXYZ vector) which represents a corresponding target color identified by a target identifier. To this end, the application 60 determines a color space distance 106 between the target color point 104 and each of the sample color points 102. Each color space distance 106 is essentially a sphere radius between the target color point 104 and a sample color point 102. Accordingly, the application 60 generates the color space distances 106 using the following equation:

$$\text{distance} = (X_{sample} - X_{target})^2 + (Y_{sample} - Y_{target})^2 + (Z_{sample} - Z_{target})^2)^{1/2}.$$

As shown in FIG. 5, the sample color point 102-1 is the closest sample color point 102 to the target color point 104 (see distance 106-1). Accordingly, the application 60 considers the sample color identified by the sample color point 102-1 (i.e., the sample identifier 90 corresponding to the sample color point 102-1) to be the best match to the target color identified by the target color point 104. The sample color point 102-2 is the next closest sample color point 102 to the target color point 104.

On occasion, the application 60 may need to choose between multiple sample color points 102 which are roughly the same distance from the target color point 104 in order to match a sample color to the target color. That is, the sample color points 102, which are closest to the target color point 104, may be within a predetermined threshold. In one arrangement, the application 60 simply chooses the closest sample color point 102 to match a sample color to the target color. In another arrangement, the application 60 selects a sample color based on hue plane distances, as will now be described with reference to FIG. 6.

Figure 6:
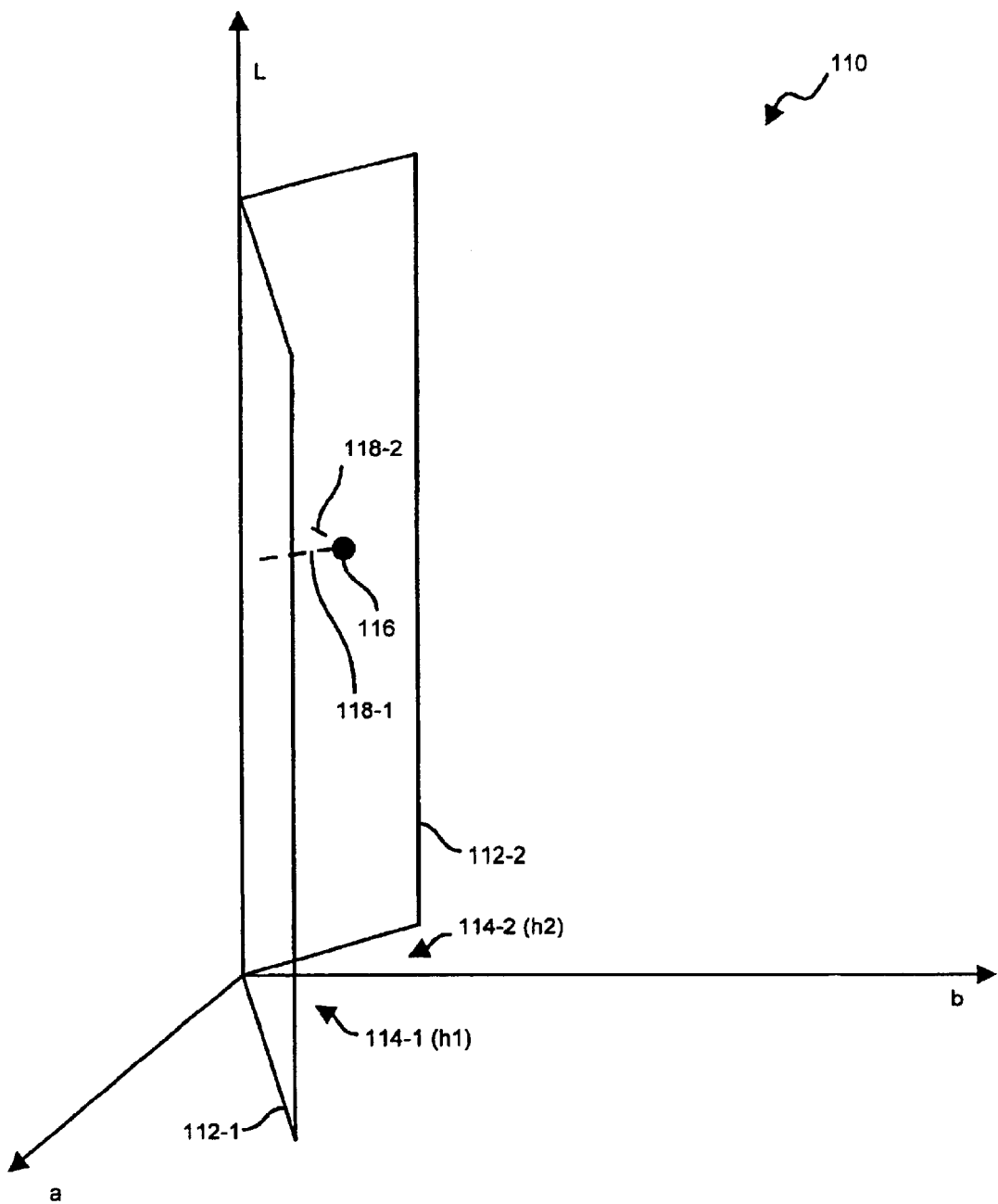
FIG. 6 is a diagram illustrating a technique used by the color management system of FIG. 3 for determining color space distances between a target color and sample colors within a device independent LAB color space.

The sample colors identified by the sample identifiers 90 can be plotted in another device independent color space such as the CIELab color space defined by the CIE. FIG. 6 shows a 3-dimensional graph of the CIELab color space. For illustration purposes, FIG. 6 includes multiple hue planes 112 which correspond to sample colors identified by the sample identifier 90 stored in the sample color database 64. For example, the hue plane 112-1 identifies the sample color represented by the sample color point 102-1 in FIG. 5. Similarly, the hue plane 112-2 identifies the sample color represented by the sample color point 102-2 in FIG. 5. Each sample color has a hue (h) which is identified by the angle 114 from the (b) axis. For example, the sample color identified by hue plane 112-1 has a hue (h1) identified by the angle 114-1. Similarly, the sample color identified by hue plan 112-2 has a hue (h2) identified by the angle 114-2. Those skilled in the art understand that the angles can be determined from the following equation:

$$h = \arctan(b/a).$$

A target color can be represented as a hue plane or, if the chroma is available, as a point 116 (i.e., a CIELab vector) in the CIELab color space. The application 60 is capable of determining the distances between the target color hue plane and the sample color hue planes 112 (angular degree differences), or the distances 118 between the target color point 116 and the sample color hue planes 112 (straight line distances) in order to determine which sample color hue plane 112 is closest in the device independent CIELab color space. The application 60 then selects the sample color identified by the closest sample color hue plane 112 as the best match for the target color. Further details of the color lookup table 62 will now be provided with reference to FIG. 7.

FIG. 7 shows a format which is suitable for use by the color lookup table 62 (also see FIG. 3). The color look up table 62 includes multiple entries 120-1, . . . , 120-R (collectively, entries 120). Each entry 120 includes an index portion 122 or target identifier portion containing a value that identifies a target color, a sample identifier portion 124 containing a sample identifier 90 that identifies a sample color matched to the target color, and an additional information portion 126. Each index portion 122 has a unique value to uniquely identify each entry 120. Each sample identifier portion 124, as described above, a identifies a unique sample color (i.e., describes a colors for a unique sample color area 44). Each additional information portion 126 enables the color management system 70 to specially mark particular entries 120 which include poor color matches. That is, there are some target colors which do not have a very close matching sample color. If the color management system 70 outputs a region of a single sample color in an attempt to match that target color, the output may appear grainy or patterned. To avoid this situation, one arrangement of the invention involves the color management system 70 alternating multiple sample colors in a random manner when color matching that target color. In such an situation, the output tends to be less grainy and not as patterned in appearance. Further details of how the color management system 70 operates will now be described with reference to FIG. 8.

Techniques for Creating a Color Lookup Table

Figure 8:
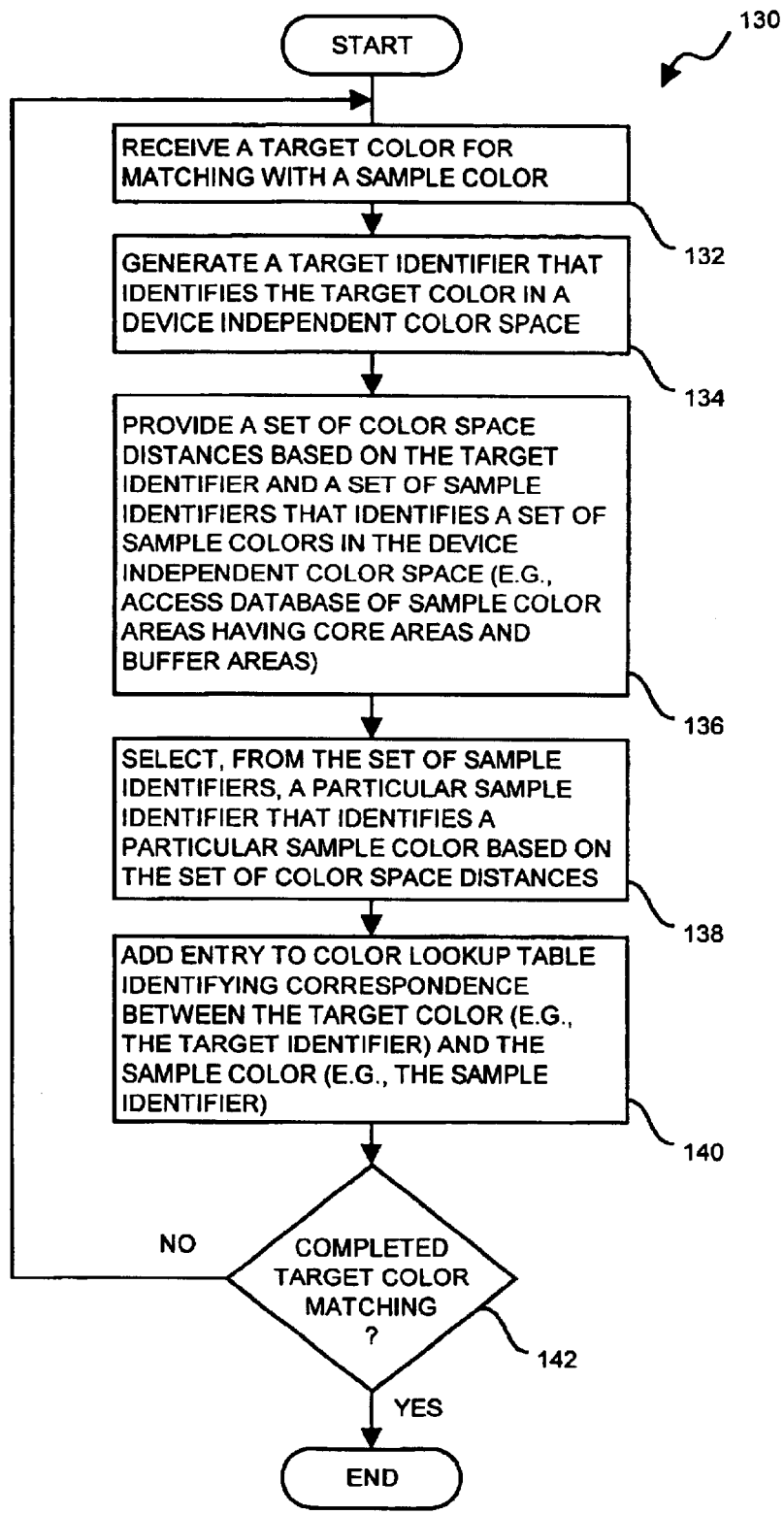
FIG. 8 is a flow diagram of a procedure performed by the color management system of FIG. 3 to form the color lookup table of FIG. 7.

As stated earlier, the invention is directed to techniques for creating a color lookup table which stores matches between target colors identified by target identifiers and sample colors identified by sample identifiers. FIG. 8 illustrates a procedure 130 which is performed by the color management system 70 of FIG. 3 to create the color lookup table 62. The color management system 70 is under direction of the controller 78. In step 132, the generator module 72 receives the target color signal 80 identifying a target color for matching with a sample color.

In step 134, the controller 78 directs the generator module 134 to generate a target identifier 122 that identifies the target color in a device independent color space (e.g., the CIEXYZ color space). In one arrangement, the generator module 134 forms the target identifier 122 such that it has the same format as the sample identifiers 90 (e.g., see formats 92, 94 and 96 as shown in FIG. 4).

In step 136, the controller 78 directs the distance module 74 to provide a set of color space distances based on the target identifier and the set of sample identifiers 90. The distance module 74 accesses the sample identifiers 90 from the sample color database 64 and determines a color space distance between the target color and each sample color identified by the sample identifiers 90.

In step 138, the controller 78 directs the selector module 76 to select, from the sample identifiers 90, a particular sample identifier 90 that identifies a particular sample color. The selector module 76 selects the sample identifier 90 from the set based on the color space distances provided by the distance module 74.

In step 140, the controller 78 adds an entry 120 to the color lookup table 62 identifying a correspondence between the target color and the sample color (also see FIG. 7). That is, the controller 78 stores values in the index portion 122, the sample identifier portion 124 and the additional information portion 126 of that entry 120. In one arrangement, the controller 78 sets the index portion 122 of that entry 120 to a unique value (e.g., stores the target identifier identifying the target color as the unique value). In another arrangement, the controller 78 sets the contents of the index portion 122 to a shorter key value that uniquely identifies the entry 90. At this time, the controller 78 determines whether the sample color is a close match to the target color. If not, the controller 78 sets the additional information portion 126 of the new entry 120 to indicate that the sample color is a poor match, e.g., sets a particular bit to specially mark the entry.

In step 142, the controller 78 determines whether the color management system 70 matches another target color. If so, the controller 78 proceeds to step 132 to repeats steps 132 through 140 to add another entry into the color lookup table 62. Otherwise (e.g., in response to an exit message, a shutdown command or reset operation), the controller 78 terminates the procedure 130.

The target colors which are matched to sample colors by the procedure 130 can be randomly selected, or specifically chosen from a range of colors to be covered by the color lookup table 62. Once the color lookup table 62 is created, the computer system 32 can simply access the color lookup table 62 to match an earlier matched target color (i.e., identified by a target color identifier) to a sample color.

Figure 9:
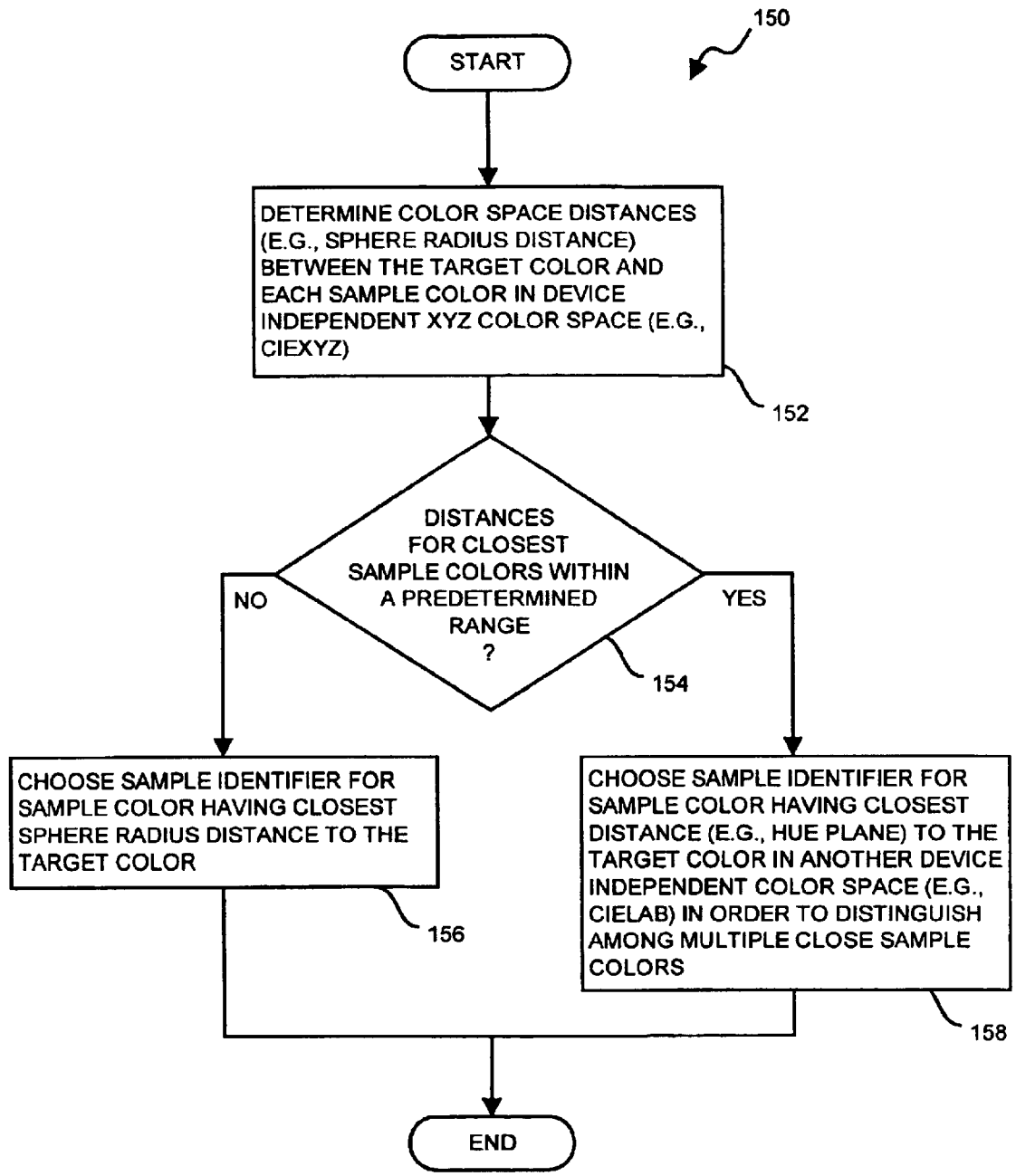
FIG. 9 is a flow diagram of a procedure which is suitable for use as a step of selecting a color identifier of the procedure of FIG. 9.

FIG. 9 shows a procedure 150 for determining color space distances and selecting a sample color (i.e., a sample identifier 90) which is a suitable alternative for steps 136 and 138 in the procedure 130 of FIG. 8. In step 152, the controller 78 directs the distance module 76 to determine color space between the target color and each sample color in an XYZ color space (e.g., CIEXYZ). In one arrangement, the distances are the sphere radius distances between the target color and the sample colors.

In step 154, the controller 78 determines whether the distances for the closest sample colors are within a predetermined range (e.g., whether they are within 10% of each other). If the distances for the two closest sample colors are not within the predetermined range (e.g., 10% of each other), the controller 78 proceeds to step 156. Otherwise, the controller proceeds to step 158.

In step 156, the controller 78 directs the selector module 76 to choose the sample identifier 90 for the sample color having the closest sphere radius distance to the target color. Accordingly, the selected sample identifier 90 identifies the sample color which is closest to the target color in the XYZ color space (e.g., CIEXYZ color space).

In step 158, the controller 78 directs the selector module 76 to choose the sample identifier 90 for the sample color having the closest distance to the target color in another device independent color space (e.g., non-CIEXYZ color space) in order to distinguish among multiple close sample colors. In one arrangement, the controller 78 directs the selector module 76 to choose the sample identifier 90 for the sample color having the closest hue plane in CIELab color space. In this situation, the closest sample color in CIEXYZ color space may not be chosen. Rather, another sample color may be chosen when that other sample color is closer in hue in the CIELab color space than that of the closest sample color in CIEXYZ color space.

Techniques for Outputting a Sample Color which Matches a Target Color

As stated earlier, the invention is directed to techniques for outputting a sample color which matches a target color by accessing a color lookup table. With reference to FIG. 3, once the color management system 70 has created the color lookup table 62, the color management system 70 is capable of matching a target color to one of the sample colors identified by the sample identifiers 90 by accessing the color lookup table 62. To this end, the color management system 70 performs a procedure 160 as shown in FIG. 10.

Figure 10:
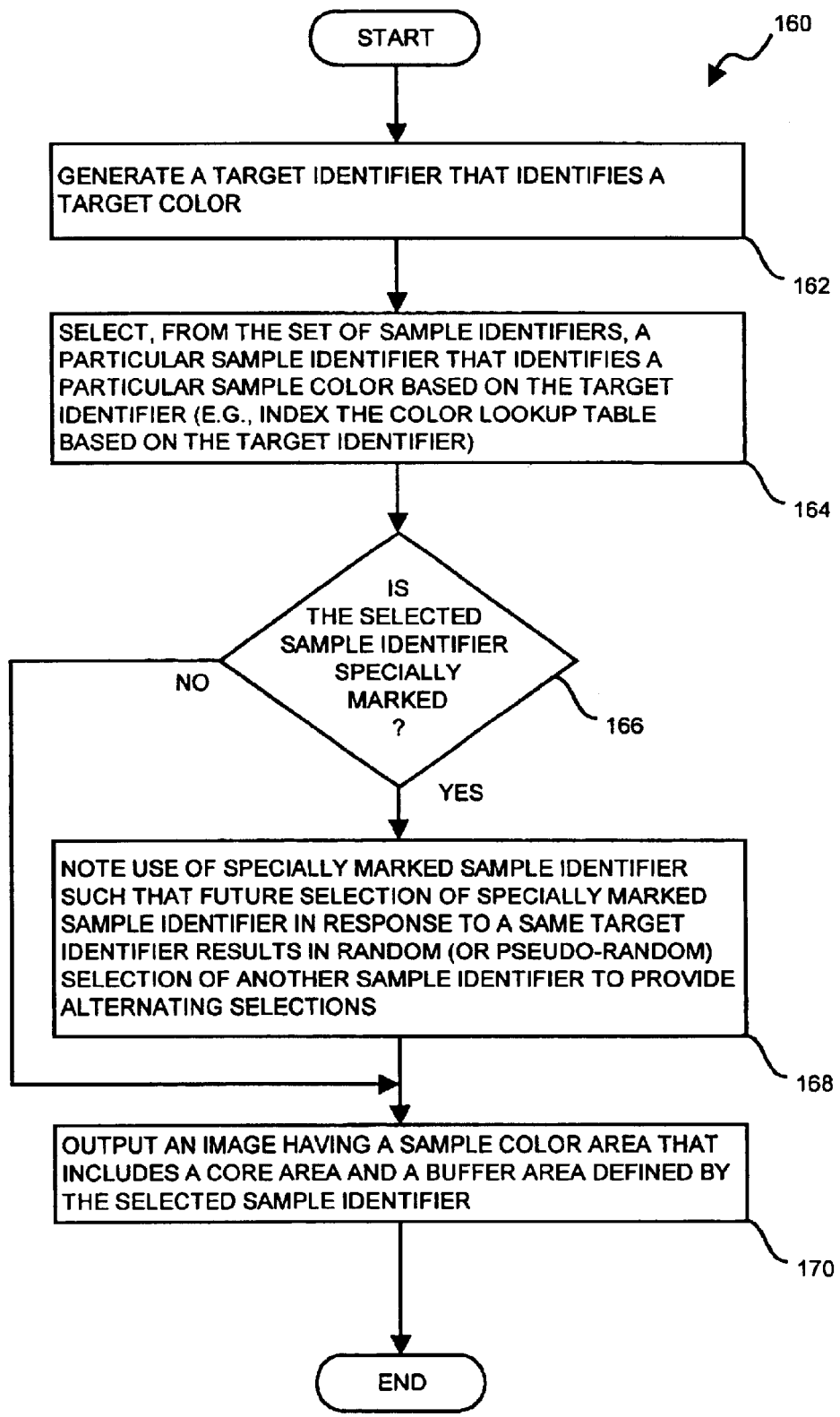
FIG. 10 is a flow diagram of a procedure performed by the color management system of FIG. 3 to output a color area in response to target color signal that defines a target color.

In FIG. 10, the generator module 72 receives the target color signal 80 identifying a target color. In step 162, the controller 78 directs the generator module 72 to generate a target identifier that identifies the target color. In one arrangement, the target identifier has the same format as that of the sample identifiers 90 (e.g., see formats 92, 94 and 96 of FIG. 4). In another arrangement, the target identifier does not have the same format (e.g., has a different format such as a shorter key).

In step 164, the controller 78 directs the selector module 76 to select, from the color lookup table 62, an entry 120 that identifies a sample color. The selector module 76 selects the entry 120 based on the target identifier (e.g., the key).

In step 166, the controller 78 checks the additional information portion 126 of the entry 120 to determine whether the sample color has been determined to be a poor match of the target color (e.g., checks whether a particular bit of the portion 126 has been set). If the entry 120 indicates a poor match, the controller 78 proceeds to step 168. Otherwise, the controller 78 proceeds to step 170.

In step 168, the controller 78 notes the use of the sample color identified by the selected entry 120 such that future selection of the selected entry 120 to match the same target color results in random (or pseudo-random) selection of another entry to provide another selection. Such random selection provides a less grainy and less patterned appearance to an image containing a region of poorly matched sample color.

In step 170, the controller 78 provides the sample color signal 82 for use by the printer 34 (FIG. 2). In particular, the controller 78 directs the printer 34 to output a sample color area 44 onto the printable medium 38. The controller 78 can repeat the procedure 160 to output additional sample color areas 44 to form the arrangement 46 of sample color areas 44 (e.g., an image, a region of color, etc.).

Techniques for Ranking Sample Colors Relative to a Target Color

Figure 11:
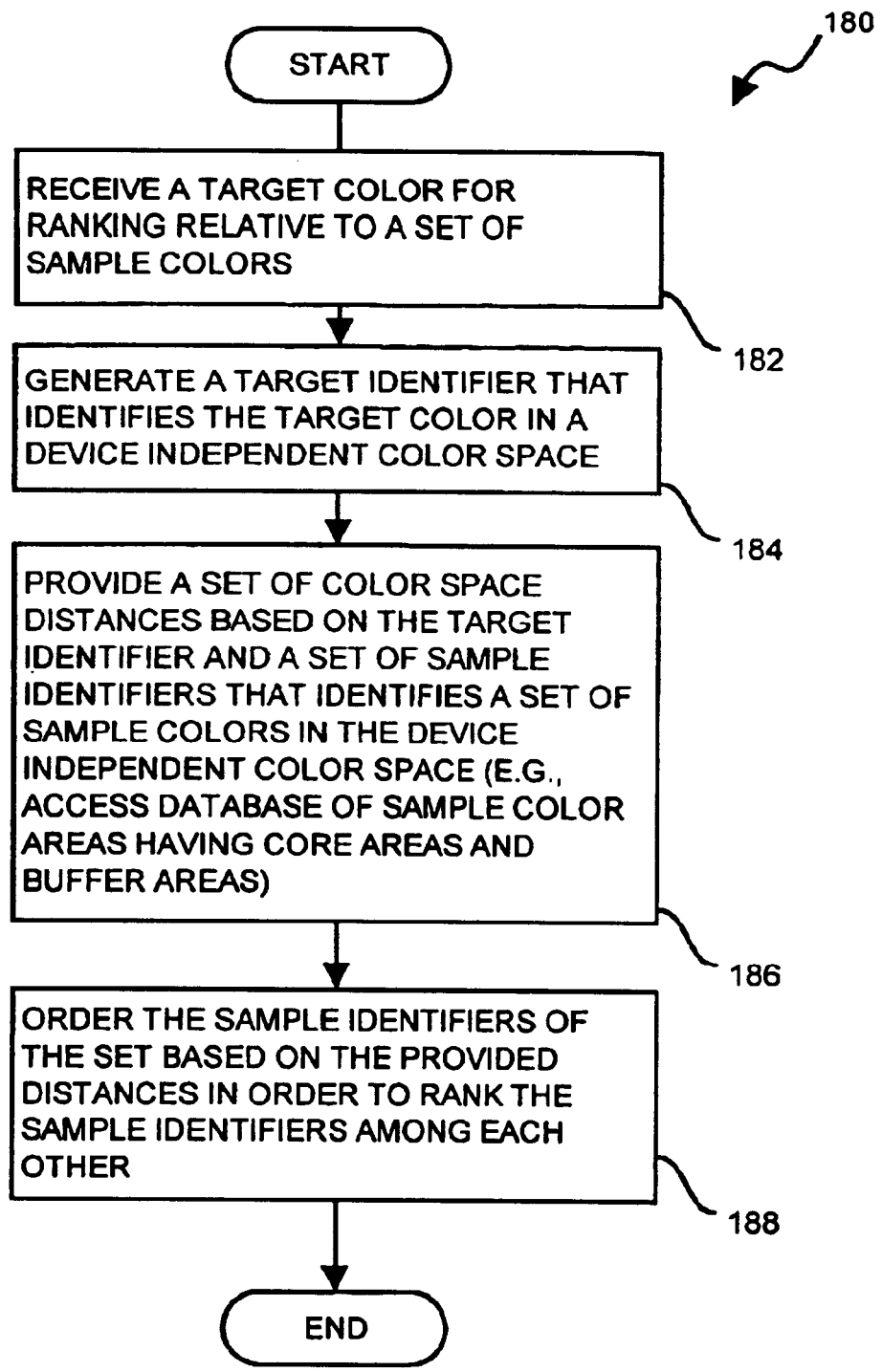
FIG. 11 is a flow diagram of a procedure for ranking a set of sample colors relative to a target color which can be performed by the color management system of FIG. 3.

The invention is directed to techniques for ranking sample colors relative to a target color based on color space distances. FIG. 11 shows a procedure 180 which is performed by the color management system 70 to rank sample colors relative to a target color based on color space distances. Such a ranking is useful to confirm proper color matching by the color management system 70.

In step 182, the generator module 72 receives the target color signal 80. The signal 80 identifies a target color for ranking relative to the set of sample colors identified by the sample identifiers 90.

In step 184, the controller 78 directs the generator module 72 to generate a target identifier that identifies the target color in a device independent color space (e.g., CIEXYZ color space). In one arrangement, the target identifier has the same format as the sample identifiers 90 (see formats 92, 94 and 96 in FIG. 4).

In step 186, the controller 78 directs the distance module 74 to provide a set of color distances based on the target identifier and the sample identifiers 90. The distance module 74 accesses the sample identifiers 90 from the sample color database 64 and determines a color space distance between the target color and each sample color identified by the sample identifiers 90 (e.g., sphere radius distances).

In step 188, the controller 78 directs the selector module 76 to rank the sample identifiers 90 based on the provided distances. That is, the selector module 76 orders the sample identifiers 90 from the sample identifier 90 identifying the closest sample color to the target color (in terms of distances in the device independent color space), to the sample identifier 90 identifying the farthest sample color to the target color. The result is a list of the sample identifiers 90 ranked among each other. An observer can then view the list to confirm that the color management system 70 properly selects sample colors, to assess the ability of the color management system 70 in matching sample colors to target colors, etc.

Conclusion

The color management techniques of the invention include (i) creating, based on color space distances, a color lookup table which stores matches between target colors identified by target identifiers and sample colors identified by sample identifiers, (ii) outputting a sample color which matches a target color by accessing the color lookup table, and (iii) ranking sample colors relative to a target color based on color space distances. As explained above, these techniques are suitable for use with a computer system having a general purpose computer and a color output device. Use of the invention enable production of clearer, crisper colors that are closely matched to the colors initially specified. In one arrangement, the computer system uses a color management application when operating in accordance with these techniques. The techniques of the invention may be employed in computer systems, and other computer-related devices and procedures such as those developed by the Brown University Research Foundation of Providence, R.I.

While this invention has been particularly shown and described with references to preferred embodiments thereof, it will be understood by those skilled in the art that various changes in form and details may be made therein without departing from the spirit and scope of the invention as defined by the appended claims.

Figure 12:
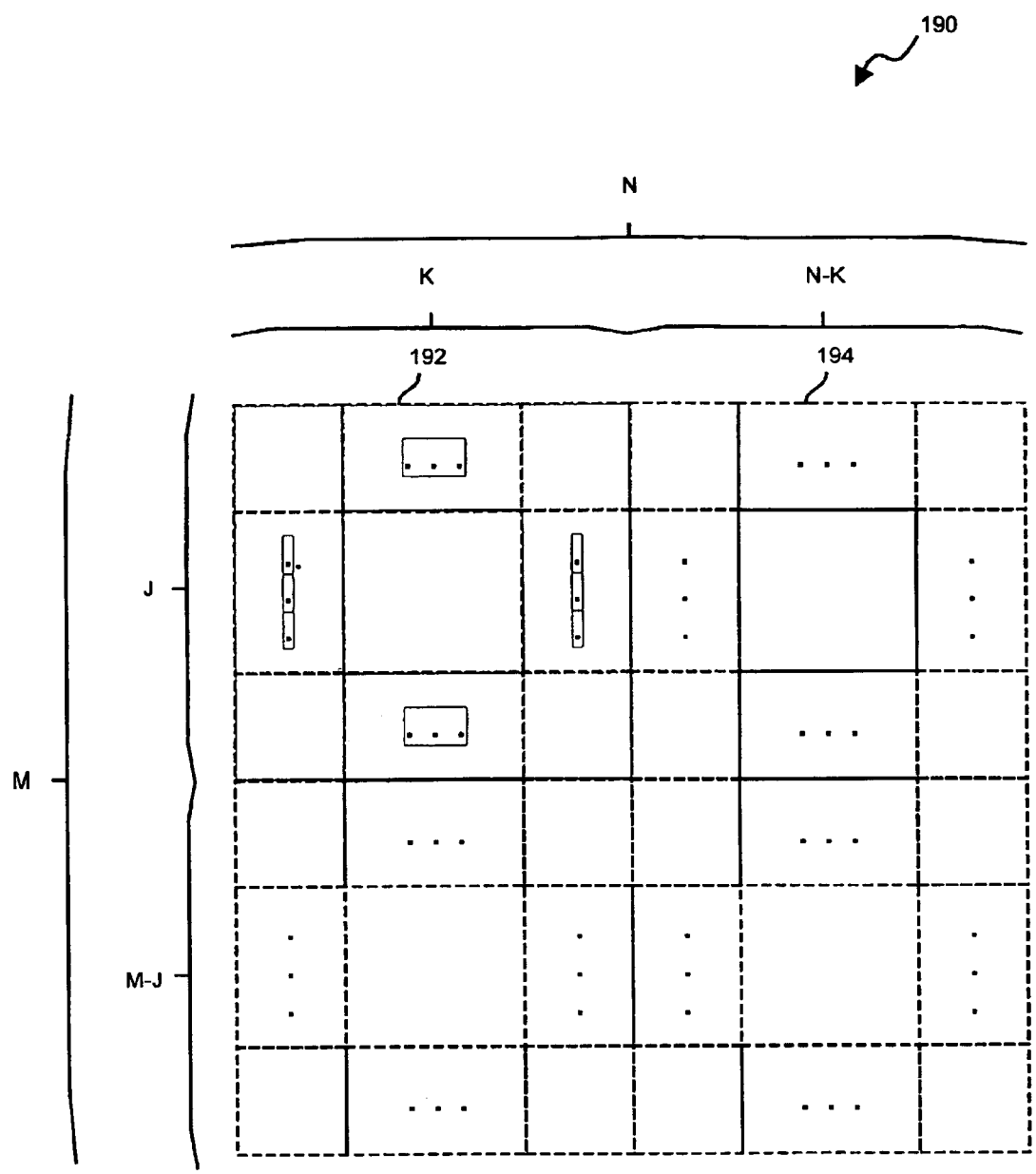
FIG. 12 is a block diagram of a general color area which is suitable for use by the color management system of FIG. 3.

For example, it should be understood that the 3×3 sample color area 44 having a 2×2 core area 48 and single column/row buffer area 50 was provided by way of example for illustration purposes only. Other arrangements for the sample color area 44 are suitable for use by the invention and are intended to be within the scope of the invention. FIG. 12 shows a generalized sample color area 190 which is suitable for use by the invention as well. The sample color area 190 includes an M×N matrix of dots. The M×N matrix includes a smaller J×K matrix of dots 192 and an adjacent buffer area 194. M, N, J and K are positive integers. The buffer area 194 includes at least one column of dots and at least one row of dots as shown in FIG. 12.

Additionally, it should be understood that the computer system 30 was shown as including a color printer 34 by way of example only. The computer system 30 can alternatively include a different color output device 34 such as a color plotter, a color display (CRT, monitor, etc.), or other color output device.

Furthermore, it should be understood that the color management system 70 was shown as being exclusively formed by the general purpose computer 30 running an application 60 (see FIGS. 2 and 3) by way of example only. In an alternative arrangement, the color management system 70, resides at least in part, in the color output device 34. For example, the computer 30 can provide the target color signal 80 to the output device 34 through the connecting medium 36. In response, the output device 34 can match a target color identified by the target color signal 80, and generate the sample color signal 82. The output device 34 can then output color (e.g., print on the printable medium 38) based on the sample color signal 82.

Additionally, it should be understood that the techniques of the invention do not need to rely on the CIEXYZ color space and that its use by the invention was provided by way of example only. For example, the color management system 70 can create a color lookup table 62 by obtaining color space distances in CIELab color space (see step 136 of FIG. 8) and then selecting sample colors exclusively based on the CIELab color space distances (e.g., based exclusively on hue plane distances).

Furthermore, it should be understood that the sample identifier portions 124 of the color lookup table 62 do not need to include sample identifiers 90, as shown in FIG. 7. Rather, the portion 124 of the color lookup table 62 can simply include pointers to the sample identifiers 90. Such a color lookup table can require less space than the arrangement that stores actual sample identifiers 90.

Additionally, it should be understood that the procedures of FIGS. 8 through 11 can be modified. For example, steps 166 and 168 in FIG. 10 can be removed such that step 164 proceeds directly to step 170. With such a modification, the color management system 70 simply outputs a sample color of the first selected sample color. In such an arrangement there is no alternation of sample color to reduce patterning, but a faster processing time in selecting sample colors and a simpler procedure 160.

Furthermore, it should be understood that the invention was described as using the color spaces CIEXYZ and CIELab by way of example only. Device independent colors other than the CIEXYZ and CIELab can be used by the invention as well.

Moreover, it should be understood that the output device 34 was described as a color printer which uses cyan, magenta and yellow ink by way of example only. Other ink combinations are suitable for use as well (e.g., red, green and blue; cyan, magenta, yellow and black, etc.).

Additionally, it should be understood that the color of the buffer area 50 of the sample color area 44 was described as a solid color by way of example only. It should be understood that the color of the buffer area 50 can be any predefined pattern. In particular, in another arrangement, the buffer area 50 of the sample color area 44 is a predefined non-solid color.

What is claimed is:

1. A method for matching a target color with a sample color, the method comprising the steps of:
   A. generating a target identifier that identifies a target color in a device independent color space;
   B. providing a set of color space distances based on (i) the target identifier and (ii) a set of sample identifiers that identifies a set of sample colors in the device independent color space, wherein each sample identifier defines a sample color area having a core area and a buffer area adjacent the core area, wherein the core area of the sample color area defined by each sample identifier includes a unique set of colors, and wherein the buffer area of the sample color area defined by each sample identifier is a same common color; and
   C. selecting, from the set of sample identifiers, a particular sample identifier that identifies a particular sample color based on the set of color space distances, in order to match the target color with the particular sample color.

2. The method of claim 1, further comprising the steps of:
   repeating steps A, B and C for other target colors in order to match multiple target colors to multiple sample colors identified by the set of sample identifiers; and
   creating a color lookup table having multiple entries that match the multiple target colors to the multiple sample colors.

3. The method of claim 1 wherein each color space distance is a sphere radius between the target color and one of the set of sample colors in the device independent color space, and wherein step C includes the step of:
   choosing, as the particular sample identifier, a sample identifier that identifies a sample color that provides a shortest sphere radius between the target color and any of the set of sample colors in the device independent color space.

4. The method of claim 1 wherein step C includes the step of:
   determining that multiple sample colors provide substantially the same shortest sphere radius; and
   choosing, from multiple sample identifiers that identify the multiple sample colors, a sample identifier that identifies a sample color that provides a closest hue plane to the target color in another device independent color space.

5. The method of claim 1 wherein step C includes the step of:
   obtaining, as the particular sample identifier, a data structure that defines (i) a J×K matrix of colored dots to form a core area, and (ii) multiple colored dots adjacent the J×K matrix to form a buffer area; wherein the core and buffer areas combine to form sample color area having an M×N matrix of dots; wherein J, K, M and N are integers; wherein J is less than M; and wherein K is less than N.

6. The method of claim 1 wherein the method is performed within a computer system having a color lookup table based on selections of sample identifiers, and wherein the method further includes the step of:
   providing sample color areas onto a medium in response to accessing the color lookup table, the sample color areas being adjacent to each other to form a 2-dimensional region on the medium.

7. A system for matching a target color with a sample color, comprising:
   a generator module that generates a target identifier which identifies a target color in a device independent color space;
   a distance module that provides a set of color space distances based on (i) the target identifier and (ii) a set of sample identifiers that identifies a set of sample colors in the device independent color space, wherein each sample identifier defines a sample color area having a core area and a buffer area adjacent the core area, wherein the core area of the sample color area defined by each sample identifier includes a unique set of colors, and wherein the buffer area of the sample color area defined by each sample identifier is a same common color; and a selector module that selects, from the set of sample identifiers, a particular sample identifier that identifies a particular sample color based on the set of color space distances, in order to match the target color with the particular sample color.

8. The system of claim 7, further comprising:

a controller that (i) operates the generator, distance, and selector modules for other target colors in order to match multiple target colors to multiple sample colors identified by the set of sample identifiers, and (ii) creates a color lookup table having multiple entries that match the multiple target colors to the multiple sample colors.

9. The system of claim 7 wherein each color space distance is a sphere radius between the target color and one of the set of sample colors in the device independent color space; and wherein the selector module performs a selection routine that chooses, as the particular sample identifier, a sample identifier that identifies a sample color that provides a shortest sphere radius between the target color and any of the set of sample colors in the device independent color space.

10. The system of claim 7 wherein the selector module performs a selection routine that, when multiple sample colors provide substantially the same shortest sphere radius, chooses, from multiple sample identifiers that identify the multiple sample colors, a sample identifier that identifies a sample color that provides a closest hue plane to the target color in another device independent color space.

11. The system of claim 7 wherein the selection module is configured to obtain, as the particular sample identifier, a data structure that defines (i) a J×K matrix of colored dots to form a core area, and (ii) multiple colored dots adjacent the J×K matrix to form a buffer area; wherein the core and buffer areas combine to form sample color area having an M×N matrix of dots; wherein J, K, M and N are integers; wherein J is less than M; and wherein K is less than N.

12. The system of claim 7, further comprising:

a controller configured to build a color lookup table based on selections of sample identifiers; and an output device configured to provide sample color areas onto a medium in response to accessing the color lookup table, the sample color areas being adjacent to each other to form a 2-dimensional region on the medium.

13. A computer readable medium having instructions stored thereon for matching a target color with a sample color, such that the instructions, when carried out by a processor, cause the processor to perform the steps of:

A. generating a target identifier that identifies a target color in a device independent color space;

B. providing a set of color space distances based on (i) the target identifier and (ii) a set of sample identifiers that identifies a set of sample colors in the device independent color space, wherein each sample identifier defines a sample color area having a core area and a buffer area adjacent the core area, wherein the core area of the sample color area defined by each sample identifier includes a unique set of colors, and wherein the buffer area of the sample color area defined by each sample identifier is a same common color; and C. selecting, from the set of sample identifiers, a particular sample identifier that identifies a particular sample color based on the set of color space distances, in order to match the target color with the particular sample color.

14. The computer readable medium of claim 13 wherein step C includes the step of:

determining that multiple sample colors provide substantially the same shortest sphere radius; and choosing, from multiple sample identifiers that identify the multiple sample colors, a sample identifier that identifies a sample color that provides a closest hue plane to the target color in another device independent color space.

15. The computer readable medium of claim 13 wherein the instructions cause the processor to further perform the steps of:

building a color lookup table based on selections of sample identifiers; and providing sample color areas onto a medium in response to accessing the color lookup table, the sample color areas being adjacent to each other to form a 2-dimensional region on the medium.

16. A method for providing an image having a sample color that matches a target color, the method comprising the steps of:

A. generating a target identifier that identifies a target color;

B. from a set of sample identifiers and based on the target identifier, selecting a sample identifier that identifies a sample color in order to match the target color with the sample color, wherein each sample identifier defines a sample color area having a core area and a buffer area adjacent the core area, wherein the core area of the sample color area defined by each sample identifier includes a unique set of colors, and wherein the buffer area of the sample color area defined by each sample identifier is a same common color; and C. outputting an image having the sample color area defined by the selected sample identifier.

17. The method of claim 16 wherein a color lookup table includes multiple entries, wherein each entry of the color lookup table includes a sample identifier of the set of sample identifiers, and wherein step B includes the step of:

choosing an entry of the color lookup table based on the generated target identifier, the sample identifier of the chosen entry being the selected sample identifier that identifies the sample color that is matched to the target color.

18. The method of claim 16 wherein step B includes the step of:

obtaining, as the selected sample identifier, a data structure that defines (i) a J×K matrix of colored dots to form a core area, and (ii) multiple colored dots adjacent the J×K matrix to form a buffer area; wherein the core and buffer areas combine to form sample color area having an M×N matrix of dots; wherein J, K, M and N are integers; wherein J is less than M; and wherein K is less than N.

19. The method of claim 16, further comprising the steps of:

determining, for a region of another target color, that the other target color does not match any of the set of sample colors within a predetermined color distance in the device independent color space; and from the set of sample identifiers and in a pseudo-random manner, selecting multiple sample identifiers that identify different sample colors in order to match the region of the other target color with the different sample colors identified by the multiple sample identifiers in an alternating manner.

20. The method of claim 16 wherein the method is performed within a computer system having a color lookup table which includes multiple entries, each entry of the color lookup table including a sample identifier of the set of sample identifiers, and wherein step C includes the step of:

providing sample color areas onto a medium in response to accessing the color lookup table, the sample color areas being adjacent to each other to form a 2-dimensional region on the medium.

21. A system for providing an image having a sample color that matches a target color, comprising:

a generator module that generates a target identifier that identifies a target color;

a selector module that selects, from a set of sample identifiers and based on the target identifier, a sample identifier that identifies a sample color in order to match the target color with the sample color, wherein each sample identifier defines a sample color area having a core area and a buffer area adjacent the core area, wherein the core area of the sample color area defined by each sample identifier includes a unique set of colors, and wherein the buffer area of the sample color area defined by each sample identifier is a same common color; and an output device that outputs an image having the sample color area defined by the selected sample identifier.

22. The system of claim 21, further comprising:

memory that stores a color lookup table having multiple entries, wherein each entry of the color lookup table includes a sample identifier of the set of sample identifiers, and wherein the selector module is configured to choose an entry of the color lookup table based on the generated target identifier, the sample identifier of the chosen entry being the selected sample identifier that identifies the sample color that is matched to the target color.

23. The system of claim 21 wherein the selector module is configured to obtain, as the selected sample identifier, a data structure that defines (i) a J×K matrix of colored dots to form a core area, and (ii) multiple colored dots adjacent the J×K matrix to form a buffer area; wherein the core and buffer areas combine to form sample color area having an M×N matrix of dots; wherein J, K, M and N are integers; wherein J is less than M; and wherein K is less than N.

24. The system of claim 21, further comprising:

a controller that selects, from the set of sample identifiers and in a pseudo-random manner, multiple sample identifiers that identify different sample colors in order to match the region of the other target color with the different sample colors identified by the multiple sample identifiers in an alternating manner when the controller determines that, for a region of another target color, that the other target color does not match any of the set of sample colors within a predetermined color distance in the device independent color space.

25. The system of claim 21, further comprising:

memory which stores a color lookup table which includes multiple entries, each entry of the color lookup table including a sample identifier of the set of sample identifiers, and wherein the output device is configured to provide sample color areas onto a medium in response to accessing the color lookup table stored in the memory, the sample color areas being adjacent to each other to form a 2-dimensional region on the medium.

26. A computer readable medium having instructions stored thereon for providing an image having a sample color that matches a target color, such that the instructions, when carried out by a processor, cause the processor to perform the steps of:

A. generating a target identifier that identifies a target color;

B. from a set of sample identifiers and based on the target identifier, selecting a sample identifier that identifies a sample color in order to match the target color with the sample color, wherein each sample identifier defines a sample color area having a core area and a buffer area adjacent the core area, wherein the core area of the sample color area defined by each sample identifier includes a unique set of colors, and wherein the buffer area of the sample color area defined by each sample identifier is a same common color, and C. outputting an image having the sample color area defined by the selected sample identifier.

27. The computer readable medium of claim 26 wherein step B includes the step of:

obtaining, as the selected sample identifier, a data structure that defines (i) a J×K matrix of colored dots to form a core area, and (ii) multiple colored dots adjacent the J×K matrix to form a buffer area; wherein the core and buffer areas combine to form sample color area having an M×N matrix of dots; wherein J, K, M and N are integers; wherein J is less than M; and wherein K is less than N.

28. The computer readable medium of claim 26 wherein step C includes the step of:

accessing a color lookup table which includes multiple entries, each entry of the color lookup table including a sample identifier of the set of sample identifiers, and providing sample color areas onto a medium in response to accessing the color lookup table, the sample color areas being adjacent to each other to form a 2-dimensional region on the medium.

29. A method for ranking a set of sample colors relative to a target color, the method comprising the steps of:

A. generating a target identifier that identifies a target color in a device independent color space;

B. providing a set of color space distances based on the target identifier and a set of sample identifiers that identifies a set of sample colors in the device independent color space, wherein each sample identifier defines a sample color area having a core area and a buffer area adjacent the core area, wherein the core area of the sample color area defined by each sample identifier includes a unique set of colors, and wherein the buffer area of the sample color area defined by each sample identifier is a same common color; and C. based on the set of color space distances, ordering sample identifiers of the set of sample identifiers in order to rank the sample colors identified by the sample identifiers relative to the target color.

30. A system for ranking a set of sample colors relative to a target color, the system comprising:

a generator module that generates a target identifier that identifies a target color in a device independent color space;

a distance module that provides a set of color space distances based on the target identifier and a set of sample identifiers that identifies a set of sample colors in the device independent color space, wherein each sample identifier defines a sample color area having a core area and a buffer area adjacent the core area, wherein the core area of the sample color area defined by each sample identifier includes a unique set of colors, and wherein the buffer area of the sample color area defined by each sample identifier is a same common color; and an ordering module that orders, based on the set of color space distances, sample identifiers of the set of sample identifiers in order to rank the sample colors identified by the sample identifiers relative to the target color.

31. A computer readable medium having instructions stored thereon for ranking a set of sample colors relative to a target color, such that the instructions, when carried out by a processor, cause the processor to perform the steps of:

A. generating a target identifier that identifies a target color in a device independent color space;

B. providing a set of color space distances based on the target identifier and a set of sample identifiers that identifies a set of sample colors in the device independent color space, wherein each sample identifier defines a sample color area having a core area and a buffer area adjacent the core area, wherein the core area of the sample color area defined by each sample identifier includes a unique set of colors, and wherein the buffer area of the sample color area defined by each sample identifier is a same common color; and C. based on the set of color space distances, ordering sample identifiers of the set of sample identifiers in order to rank the sample colors identified by the sample identifiers relative to the target color.

* * * * *